(12) United States Patent
Bourgault et al.

(10) Patent No.: US 9,271,439 B2
(45) Date of Patent: Mar. 1, 2016

(54) AUTONOMUS AIR SEEDER APPARATUS WITH REMOTE OPERATOR OVERRIDE

(71) Applicant: Bourgault Industries Ltd., St. Brieux (CA)

(72) Inventors: Gerard Bourgault, St. Brieux (CA); Mark Cresswell, St. Brieux (CA); Bob Cochran, St. Brieux (CA); Scot Jagow, St. Brieux (CA)

(73) Assignee: Bourgault Industries Ltd., St. Brieux, Saskatchewan (CA)

( * ) Notice: Subject to any disclaimer, the term of this patent is extended or adjusted under 35 U.S.C. 154(b) by 182 days.

(21) Appl. No.: 14/162,931

(22) Filed: Jan. 24, 2014

(65) Prior Publication Data

US 2014/0216314 A1 Aug. 7, 2014

(30) Foreign Application Priority Data

Feb. 4, 2013 (CA) .................................. 2804569

(51) Int. Cl.

| | | |
|---|---|---|
| A01B 79/00 | (2006.01) | |
| A01C 7/08 | (2006.01) | |
| A01B 69/04 | (2006.01) | |
| A01B 69/00 | (2006.01) | |
| A01C 21/00 | (2006.01) | |
| A01B 49/06 | (2006.01) | |
| A01C 7/06 | (2006.01) | |

(52) U.S. Cl.
CPC ............... *A01C 7/081* (2013.01); *A01B 49/06* (2013.01); *A01B 69/003* (2013.01); *A01B 69/004* (2013.01); *A01B 69/008* (2013.01); *A01C 7/06* (2013.01); *A01C 21/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,390,125 | A * | 2/1995 | Sennott | B60K 31/0008 342/357.24 |
| 5,967,540 | A | 10/1999 | Gallenberg | |
| 5,974,348 | A * | 10/1999 | Rocks | G01S 1/70 348/120 |
| 2010/0043685 | A1* | 2/2010 | Gogerty | A01C 7/04 111/200 |
| 2013/0110358 | A1* | 5/2013 | Merx | A01B 69/006 701/50 |
| 2013/0325242 | A1* | 12/2013 | Cavender-Bares | A01C 21/002 701/25 |

OTHER PUBLICATIONS

Autonomous Tractor Corporation, remote control tractor made by Autonomous Tractor Corporation of Fargo, ND as seen at: http://www.autonomoustractor.com/.
(Continued)

*Primary Examiner* — Alicia Torres
(74) *Attorney, Agent, or Firm* — Frost Brown Todd LLC

(57) ABSTRACT

An air seeder includes a combination tank propulsion vehicle with mounted product tanks, and metering devices dispensing product from each product tank. A furrow opener implement is towed by the vehicle and an engine rotates the vehicle wheels and two or more implement wheels. A pneumatic distribution system conveys dispensed products to the furrow openers. The external guidance system sends location signals indicating a location of the implement frame to the operator. Steering, metering, and distribution signals are sent by both the external guidance system and an operator with a remote operator control, and operator signals override signals from the external guidance system.

11 Claims, 2 Drawing Sheets

(56) References Cited

OTHER PUBLICATIONS

"Brilliant" self-propelled air seeder made by Lemken Co. of Alpen Germany as shown at http://www.ls2009-mod.com/2010/02/09/lemken-brilliant-ls09-and-ls09-gold-ready and at: https://www.google.ca/search?q=ls+11+lemken+brilliant&rlz=1T4TSCD_enCA508MX509&tbm=isch&tbo=u&souce=univ&sa=X&ei=Ac3WUsrvMsL9oASU9ILICQ&ved=OCC4QsAQ&biw=1062&hib=483.

Gullickson, Gil, "Self-propelled seeder," Farm Industry News, Sunday, Jul. 1, 2001, made by HORSCH Maschinen GmBh of Sitzenhof, Germany as discussed at: http://farmindustrynews.com/self-propelled-seeder.

* cited by examiner

AUTONOMUS AIR SEEDER APPARATUS WITH REMOTE OPERATOR OVERRIDE

This invention is in the field of agricultural implements and in particular a seeding apparatus that includes propulsion and control.

BACKGROUND

In much of the agricultural industry, because weed control is now primarily done using herbicides rather than tillage, tillage of the soil has become greatly reduced, and it is currently very common to conduct "no-till" agricultural operations with no tillage at all. The furrow openers on modern seeding implements cut narrow furrows in the soil surface and agricultural products such as seed, fertilizer, and chemicals are deposited in the furrows. In an air seeder the furrow openers are evenly spaced across the width of an implement frame and the products are conveyed by a pneumatic conveyor system from product tanks to the furrows made by the furrow openers as a tractor tows the air seeder along the field.

The product tanks can either be mounted on the implement frame or on a separate tank cart towed either behind the implement frame or forward of the implement frame. While it is known to mount narrower width implement frames directly to a tractor or to a tank cart, more typically the implement frame is mounted on wheels and connected to a towing vehicle by a drawpin such that the towing vehicle and implement frame pivot with respect to each other about a vertical pivot axis. Where the air seeder includes a tank cart towed forward of the implement frame, known as a "tow between cart", the tank cart is connected at the front end thereof to the tractor by a drawpin and the implement frame is connected to the rear end of the tank cart by another drawpin. Where the air seeder includes a tank cart towed behind the implement frame, the implement frame is connected at the front end thereof to the tractor by a drawpin and the tank cart is connected to the rear end of the implement frame by another drawpin. The tow between cart severely reduces the visibility of the furrow openers and the ability of the operator to detect and correct plugging and like operational problems, and so the tow behind cart has become more popular.

As modern farms grow in size, air seeder manufacturers make wider air seeders with larger product tanks to cover more field area per hour and reduce the necessity to stop and refill the product tanks Thus present day air seeders can be very wide, up to 90 feet or more, and the product tanks can carry 1000 bushels or more of agricultural products, and the tank carts thus weigh 100,000 pounds or more when full, and even empty these carts weigh 30,000 to 40,000 pounds.

Tractors used to pull such large air seeders typically have 500 to 600 or more horsepower (HP). Tractors are generally ballasted to weigh about 100 pounds per horsepower to have sufficient traction to transfer the horsepower to the ground, and these large tractors thus weigh 50,000 to 60,000 pounds. Thus, a large air seeder train can weigh over 150,000 pounds, and this weight passing over the field surface can cause soil compaction, especially in some soil types, and reduce productivity in the soil over which the wheels of the train pass.

HORSCH Maschinen GmbH of Sitzenhof, Germany manufactures a self-propelled air seeder with an operator's station at a front end of a vehicle and a plurality of product tanks mounted on the same vehicle behind the operator's station, essentially combining the tractor and product tank cart of the conventional air seeder and reducing the weight. A furrow opener implement comprising an implement frame supported on wheels is connected to the rear end of the vehicle, and product is carried from the product tanks to the furrow openers by an air stream. Like the tow between cart, the large tanks directly behind the operator's station block virtually any view of the furrow openers, except those on the extreme right and left outer ends of the implement frame.

Lemken Co. of Alpen Germany have manufactured a similar self-propelled air seeder with a mounted implement frame carrying furrow openers and ground working tools. Because the furrow opener implement is mounted directly to the propulsion vehicle, the width of this machine is limited compared to the 80-90 foot wide implements desired in modern farming on large acreages.

External guidance systems include receivers mounted on the vehicle to receive location information from global positioning systems (GPS), ground based signal towers, lasers, and the like and are now commonly used to automatically steer tractors pulling air seeders and like agricultural implements to follow a desired path. After the boundaries of a field have been defined by a headland pass, the guidance system will keep track of where the seeding implement is located and provide guidance to accurately cover the field, one swath or pass at a time until the field has been fully covered. At the outset, tractors and self-propelled equipment such as field sprayers equipped with these "auto-steer" systems required human intervention to control starting and stopping the application of the agricultural products at the correct time, and to make the headland turns. The newest auto-steer systems can now control the application of agricultural products and make the headland turns without human intervention. Also, when irregular shaped areas within a field are encountered, GPS based systems have now been developed to identify overlap areas and prevent double application of the farm materials.

Such modern guidance systems can determine the location of the furrow openers to within two inches or less, and the aim is to guide the furrow openers in each pass so that a consistent spacing, typically about 10-12 inches, is achieved between the end furrow opener on one implement pass and the end furrow opener on the next adjacent pass.

Location sensors can be used to accurately determine the location of the furrow openers on the implement frame however since guidance is provided by the tractor at the front end of the train, significant deviations can occur, especially where a series of vertical pivotal connections is present between the furrow opener implement and the tractor. A heavy product cart at the rear of the chain of implements can also pull the furrow opener implement off course on sloping terrain.

In air seeders where all the product tanks are mounted on the implement frame, there is no tank cart and so there is only a single vertical pivot axis and the guidance is more accurate. With the larger product tanks desired for wide air seeders however, it is not practical to mount all product tanks on the implement frame, so larger air seeders typically require a tank cart.

The growing sophistication of external guidance systems has also led to the development of unmanned tractors, such as manufactured by Autonomous Tractor Corporation of Fargo, N.D. These tractors have diesel-electric drive and are guided by a laser based external guidance system, and include a remote control that allows control by a remote operator. A large fuel tank allows for 36 hours of operation, and a ballast tank allows the weight of the tractor to be increased or decreased as conditions might warrant by adding or removing water.

Conventionally, farmers would typically own a number of tractors of different sizes to pull the varied implements used in their operations. A large high powered tractor was used to pull the widest heavy implements that were used for tillage and seeding, and often as well to power large combines at harvest time. Smaller tractors might be used for spraying, to operate a loader, or for mowing and like lighter jobs.

Since the advent of no-till seeding, tillage is no longer carried out by many farmers. Combines of the type that are pulled behind large tractors are also no longer much in use. The result is that on many farms the largest tractor is used only for pulling the air seeder at seeding time, and sits idle for the rest of the year.

SUMMARY

It is an object of the present invention to provide an air seeder apparatus that overcomes problems in the prior art.

The self-propelled air seeders of the prior art essentially do away with the tractor and mount the drive and controls on the air seeder cart turning same into a tank propulsion vehicle, and then tow the furrow opener implement behind or mount it on the tank propulsion vehicle. The amount of weight being moved around the field is significantly reduced, thereby reducing fuel consumption and soil compaction.

Another important factor in seeding operations is the small window of time in which the seeding operation should take place to achieve maximum crop yields When the weather is wet during this period it can be difficult or impossible to operate air seeders as they sink into the wet ground, and reducing the weight also allows the machine to operate on wetter ground without sinking While the prior art self-propelled air seeders reduce the weight of the apparatus, the weight of the tank propulsion vehicle must still be enough to provide sufficient ballast to the driven wheels of the tank propulsion vehicle to maintain traction and move the apparatus along the ground in the normal seeding operation.

The present invention provides an air seeder apparatus comprising a combination tank propulsion vehicle mounted on vehicle wheels for movement along the ground along a path in response to steering signals from an external guidance system and in response to steering signals from an operator control, and steering signals from the operator control override steering signals from the external guidance system A furrow opener implement is connected to a rear end of the tank propulsion vehicle about a substantially vertical pivot axis, the implement comprising an implement frame mounted on implement wheels and a plurality of ground engaging furrow openers mounted on the implement frame. An engine mounted on the tank propulsion vehicle is connected to rotate the vehicle wheels and at least two implement wheels in response to drive signals from the external guidance system and in response to drive signals from the operator control, and drive signals from the operator control override drive signals from the external guidance system. A plurality of product tanks is mounted on the tank propulsion vehicle, and a metering device dispenses agricultural product from each product tank in response to metering signals from the external guidance system and in response to metering signals from the operator control, and metering signals from the operator control override metering signals from the external guidance system. A pneumatic distribution system is connected to receive the agricultural products dispensed by the metering devices and convey the agricultural products to the furrow openers in response to distribution signals from the external guidance system and in response to distribution signals from the operator control, and distribution signals from the operator control override distribution signals from the external guidance system. The external guidance system sends location signals indicating a location of the implement frame to the operator control, which is portable and located remote from the tank propulsion vehicle.

Thus in the present invention, the weight carried on the driven implement wheels is also utilized as ballast to facilitate transferring the required power from the engine to the ground to propel the apparatus along the ground. In a typical 80 foot wide furrow opener implement, the front center wheels are substantially larger than the other wheels in order to support the weight of the implement with the wings folded up into a transport position with all the implement weight carried by the center wheels. When in the field operating position with the wings folded down, the weight on the center forward wheels will still typically be about 9,000-10,000 pounds and the larger front wheels help to provide flotation for this weight in wet soil conditions. This weight can also be utilized as ballast instead of simply dead weight by driving these center front wheels. Thus where the weight on the center forward wheels of the furrow opener implement is 10,000 pounds, 100 HP can be transferred from the drive through the center forward wheels, and the weight of the tank propulsion vehicle can be reduced by 10,000 pounds, and the weight of the apparatus that is not used as ballast, or the dead weight, is significantly reduced. In an air seeder apparatus of the invention where a product tank is mounted on the furrow opener implement, the weight on driven implement wheels, even when the tank is empty, can be significantly more.

In the prior self-propelled air seeders, the engine horsepower and drive system are configured to provide sufficient power and traction to propel the tank propulsion vehicle and the implement frame when the product tanks are full and the furrow openers are engaged in the ground to the maximum depth contemplated, and further considering the contemplated ground slopes that will be encountered. As agricultural products are dispensed from the product tanks on the tank propulsion vehicle the weight of the vehicle decreases from a full weight when the product tanks are filled with agricultural products, to an empty weight when the product tanks are empty. When the product tanks are full there is ample weight to provide ballast and traction to the driven wheels, however the empty weight must still provide sufficient ballast to the driven wheels of the tank propulsion vehicle to maintain traction and move the apparatus along the ground in the normal seeding operation.

As agricultural products are dispensed from the product tanks and the weight of the tank propulsion vehicle decreases, the horsepower requirement also decreases somewhat since less weight is being moved along the field. In the present invention the empty weight of the tank propulsion vehicle can be reduced to take advantage of this attribute.

Where, for example the power requirement of the air seeder apparatus when filled with 50,000 pounds of product is 500 HP, the weight of the product alone provides sufficient ballast of 100 pounds per HP on the wheels of the tank propulsion vehicle, all of which are driven wheels. When the product tanks are approaching empty, the power requirement may be reduced to 450 HP, requiring a ballast weight of 45,000 pounds. With 100 HP being provided through the driven implement wheels, only 350 HP must be provided through the vehicle wheels, all of which are driven. Thus the tank propulsion vehicle needs to weigh only 35,000 pounds when empty.

Thus instead of requiring the tank propulsion vehicle to weigh 50,000 pounds in order to provide ballast for 500 HP power requirement, the weight of the tank propulsion vehicle can be reduced to 35,000 pounds. Reducing the weight of the tank propulsion vehicle and the power required to be transferred by the tank propulsion vehicle wheels means the size of these wheels can be reduced, resulting in cost savings. Alternatively where it is desired to provide as much flotation as possible in wet soil conditions, the wheels can be kept the same size or made larger, reducing the weight per unit area and increasing the flotation, or resistance to sinking into soft wet soil. This reduced weight also reduces compaction and overall power and fuel requirements.

Increasing the diameter of the center front implement wheels helps prevent the piles of soil or mud that form in front of the wheels from being as large when compared to two smaller diameter tires on a tandem or walking axle. The larger wheel can also more easily roll over or push down the pile that does tend to form. Driving the wheel adds the ability for the wheels, especially wheels with traction lugs extending from surfaces thereof, to pull down the piles of soil or mud that tend to form in front of them and provides a force to urge the wheel upwards which are beneficial in wet conditions.

The invention further overcomes the disadvantage of the self-propelled air seeders discussed above where the operator is unable to view and monitor the operation of the furrow opener implement. The tank propulsion vehicle is unmanned and guided by an external guidance system as described above. Cameras and sensors monitor any plugging conditions that may develop and encroachment sensors monitor any objects that may enter the path of the apparatus and can stop the drive systems to avoid damage.

The unmanned operation of the present invention allows for prolonged periods of operation with reduced operator stress.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
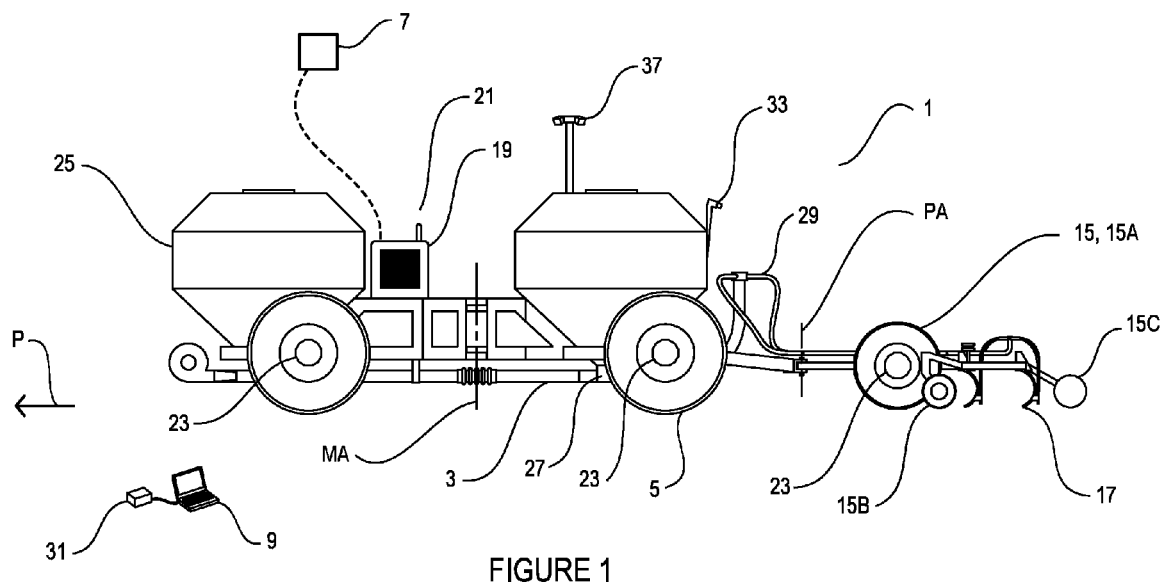
FIG. 1 is a schematic side view of an embodiment of an air seeder apparatus of the present invention.
Figure 2:
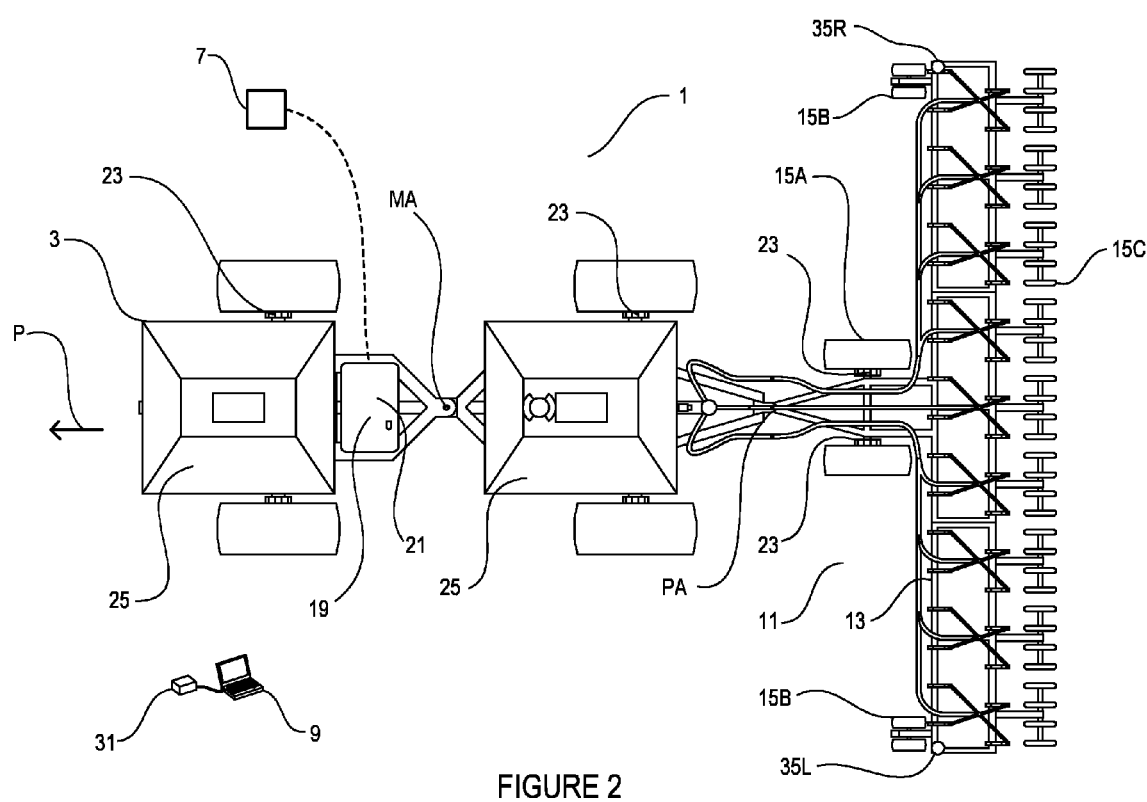
FIG. 2 is a schematic top view of the embodiment of FIG. 1.

FIGS. 1 and 2 schematically illustrate an embodiment of an air seeder apparatus 1 of the present invention comprising a combination tank propulsion vehicle 3 mounted on vehicle wheels 5 for movement along the ground along a path P in response to steering signals from an external guidance system 7 and in response to steering signals from an operator control 9. The external guidance system 7 will be of the type widely used in agricultural operations where the external guidance system 7 receives location signals from a group of global positioning satellites, a group of signal towers, laser beam or the like, and through a typical automatic steering system that guides an agricultural vehicle along a programmed path. The illustrated tank propulsion vehicle 3 is articulated about a middle pivot axis MA in the same manner as large conventional tractors.

The operator control 9 is provided by a portable wireless device that can be carried by an operator, and is located remote from the tank propulsion vehicle 3. For safety, steering signals from the operator control 9 override steering signals from the external guidance system 7. Because control is through the operator control 9, the tank propulsion vehicle 3 does not need to have an operator's station and the costly chair, audio system, air conditioning and the like found in conventional tractors or manned self-propelled air seeders. Cost and weight are thereby reduced.

A furrow opener implement 11 is connected to a rear end of the tank propulsion vehicle 3 about a substantially vertical pivot axis PA. The implement 11 comprises an implement frame 13 mounted on implement wheels 15 and a plurality of ground engaging furrow openers 17 mounted on the implement frame 13.

An engine 19 is mounted on the tank propulsion vehicle 3 and is connected to rotate all of the vehicle wheels 5 on the tank propulsion vehicle 3, and the two larger front center wheels 15A that support the front center portion of the implement frame 13 in response to drive signals from the external guidance system 7 and in response to drive signals from the operator control 9, and again drive signals from the operator control 9 override drive signals from the external guidance system 7. Thus all the weight of the tank propulsion vehicle 3 acts as ballast to the driven wheels 5. Smaller implement wheels 15B on outer portions of the implement 11 are not driven, and typically support only minimal weight compared to the weight carried by the larger implement wheels 15A. Packer wheels 15C are mounted on the end of each arm supporting a furrow opener 17, and are also not driven.

In the illustrated tank propulsion vehicle 3, the engine 19 is connected to drive a generator 21; and an electric motor 23 is connected to each vehicle wheel 5 and each of the two driving implement wheels 15A, and the generator 21 provides electric power to each electric motor 23. It is contemplated that such a diesel-electric drive system will be most efficient to build and operate, other motors such as hydraulic motors could be used as well. The driving wheels 5 of the tank propulsion vehicle 3 could interface directly with the ground surface, or through track systems as are known in the art.

A plurality of product tanks 25 is mounted on the tank propulsion vehicle 3, and a metering device 27 dispenses agricultural products such as seed, fertilizer, and chemicals from each product tank 25 in response to metering signals from the external guidance system 7 and in response to metering signals from the operator control 9, and again metering signals from the operator control override metering signals from the external guidance system 7.

A pneumatic distribution system 29 is connected to receive the agricultural products dispensed by the metering devices 27 and convey the agricultural products to the furrow openers 17 in response to distribution signals from the external guidance system 7 and in response to distribution signals from the operator control 9, and again distribution signals from the operator control 9 override distribution signals from the external guidance system 7. The external guidance system 7 also sends location signals indicating a location of the implement frame 13 to the operator control 9.

Figure 4:
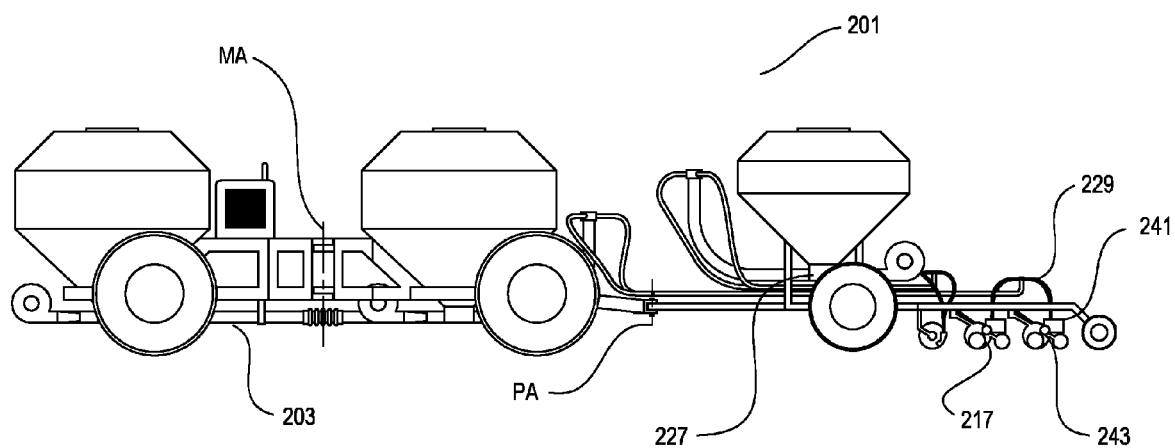
FIG. 4 is a schematic side view of a further alternate embodiment of an air seeder apparatus of the invention where the furrow openers include a plurality of row crop furrow openers such as are known on row crop planter implements.

The metering devices 27 typically will be calibrated to apply a selected rate of the dispensed product to the field, or where the apparatus is configured as a row crop planter, as schematically illustrated in FIG. 4 and described below, one of the metering devices 27 may dispense seeds to mini-hoppers on each furrow opener, and singulating meters will then dispense the selected rate of seed from the mini-hoppers.

In a typical operation the apparatus 1 will be controlled by the operator control 9 when beginning a field and the operator may be temporarily at a location on the apparatus 1, or following the apparatus 1 in a separate vehicle to monitor the apparatus and make the initial pass or passes around the field to establish the boundaries. The operator may then release guidance to the external guidance system 7, and the apparatus will continue to make passes along the field guided by the external guidance system 7 and automatic steering system, turning at the field boundaries as is known in the art. Metering signals from the external guidance system 7 will also automatically turn metering by the metering devices 27 on and off as required when turning at the boundaries, or in overlap areas. The distribution system 29 can be activated or deactivated as required as well.

The operator with the operator control 9 provides general oversight of the operation through a system control 31 operative to monitor functions of the tank propulsion vehicle 3 and implement frame 13 and display same to the operator. The system control 31 compares the functions of the tank propulsion vehicle 3 and implement frame 13 to selected ranges for each monitored function, and is operative to shut down selected functions when deviations from the selected ranges are detected. The system control 31 monitors rotation of the vehicle wheels 5 and possibly the driven implement wheels 15A, flow of agricultural product from the metering devices 27, flow of agricultural product through the distribution system 29, and location of the implement frame 13. Typically one or more cameras 33 will send real time video of the implement frame 13 to the operator control 9 so that plugged openers can be detected. Video of the tank propulsion vehicle 3 can be provided as well. Plugged openers and like deviations can also be detected by force sensors located to detect increased draft forces on the implement frame 19 for example.

The operator carrying the portable operator control 9 can monitor the operation of the apparatus 1 while carrying out other duties such as gathering agricultural products needed to refill the product tanks 25 and keep the operation going, or unrelated duties such as accounting, marketing, and the like.

It is also contemplated that the operator could monitor two or more air seeder apparatuses 1 of the present invention. The automatic nature of the operation allows the operation to continue for longer hours as operator stress is reduced. Relatively unskilled operators could also be used where the operator is required only to stop the apparatus 1 if something goes wrong, and then call in a skilled operator. These less skilled operators can also refill the product tanks 15, refuel, grease, and perform like necessary activities.

Typically right and left location sensors 35R, 35L are located at corresponding right and left ends of the implement frame 13, and send location signals to the external guidance system 7 and to the operator. An encroachment sensor 37 is operative to detect an object in the path of the implement frame 13 and send encroachment signals to the system control 31, which is operative to shut down rotation of the driven wheels 5, 15A when an object is detected in the path of the implement frame 13. Radar, lasers, sonar, or like sensors can be strategically located for the particular apparatus, and used to detect encroachments.

The weight of the tank propulsion vehicle 3 decreases as agricultural products are dispensed from the product tanks 25 from a full weight when the product tanks 25 are substantially filled with agricultural products, to an empty weight when the product tanks 25 are substantially empty. The empty weight is selected to provide sufficient ballast to the driven wheels 5, 15A to maintain traction and move the apparatus 1 along the ground in the normal seeding operation.

The engine 19 and driven wheels 5, 15A are designed to provide sufficient power and traction to propel the tank propulsion vehicle 3 and implement 11 when the product tanks 25 are full and the furrow openers 17 are engaged in the ground to the maximum depth contemplated, and further considering the contemplated ground slopes that will be encountered. As the as agricultural products are dispensed from the product tanks 25 and the weight decreases, the horsepower requirement also decreases since less weight is being moved along the field. The actual horsepower used then will be less than the available horsepower, and the empty weight necessary can be calculated at the usual 100 pounds for each actual horsepower that is being used when the product tanks are empty.

Figure 3:
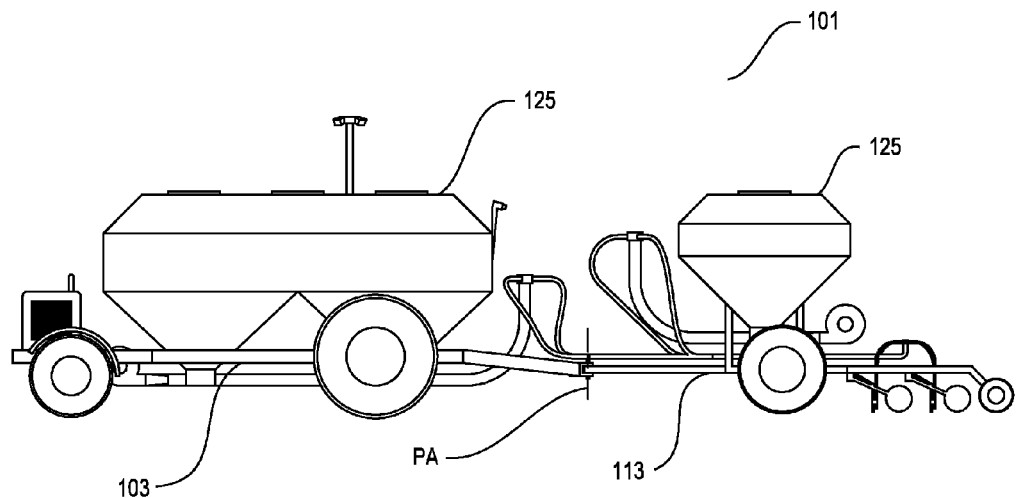
FIG. 3 is a schematic side view of an alternate embodiment of an air seeder apparatus of the present invention where the tank propulsion vehicle is rigid instead of articulated, and one of the product tanks is mounted on the implement frame.

FIG. 3 schematically illustrates an alternate air seeder apparatus 101 of the invention where the tank propulsion vehicle 103 is not articulated and where one of the product tanks 125 is mounted on the implement frame 113.

FIG. 4 schematically illustrates another alternate air seeder apparatus 201 of the invention where the tank propulsion vehicle 203 articulates about middle axis MA. The furrow openers include a plurality of row crop furrow openers 217 such as are known on row crop planter implements where a small hopper 241 is mounted on each row crop furrow opener 217 and a singulating metering device 243 dispenses seed from the hopper 241 to the row crop furrow opener 217. The pneumatic distribution system 229 receives seeds dispensed by one of the metering devices 227 and conveys the seeds to the hoppers 241 as they are required.

The present invention reduces the cost and weight of an air seeder apparatus as compared to a similar tractor powered or self-propelled seeding system of the prior art. Since the apparatus of the present invention is unmanned, the cost and weight of providing an operator's station is eliminated. The weight of the tank propulsion vehicle can be reduced as well since some of the power to propel the apparatus is provided by the implement wheels, and so the minimum ballast weight of the tank propulsion vehicle can be reduced.

By operating the seeding or planting systems unmanned, the seeding systems could typically operate more hours per given day placing far less demands on the people responsible for the operation of these systems. Because of the reduced demand on the system operators, one unmanned system would typically seed or plant significantly more acres of "per foot of width" of the ground engaging implement than a manned system because of operating more hours per day.

An important issue for an unmanned system is safety. Unmanned systems must be configured to prevent them from causing damage to people and property regardless of the circumstances. Safety systems have been developed and applied to vehicles and industrial equipment to ensure that they do not inadvertently injure people or damage property. The sensing of an encroachment into the path of the apparatus, the extremities of which are defined by the safety sensors, can immediately cause the apparatus to stop and possibly shut down the power completely. Multiple GPS or like receivers are used to ensure that the system is in the desired location and has not made its way to some undesirable location. Any conflict in location information causes the seeding or planting system to immediately stop and likely power down. Loss or degradation of the GPS signal, failure of one or more of the GPS receivers, or failure or degradation of the signal coming from land based position signal providers or laser beams causes the unmanned system to immediately stop and possibly shut down completely.

The present invention provides one or more of the following benefits: an unmanned air seeder with reduced weight, increased flotation, improved performance in wet conditions, and reduced manufacturing and operating costs.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An air seeder apparatus comprising:
   a combination tank propulsion vehicle mounted on vehicle wheels for movement along the ground along a path in response to steering signals from an external guidance system and in response to steering signals from an operator control, and wherein steering signals from the operator control override steering signals from the external guidance system;
   a furrow opener implement connected to a rear end of the tank propulsion vehicle about a substantially vertical pivot axis, the implement comprising an implement frame mounted on implement wheels and a plurality of ground engaging furrow openers mounted on the implement frame;
   an engine mounted on the tank propulsion vehicle connected to rotate the vehicle wheels and at least two implement wheels in response to drive signals from the external guidance system and in response to drive signals from the operator control, and wherein drive signals from the operator control override drive signals from the external guidance system;
   a plurality of product tanks mounted on the tank propulsion vehicle, and a metering device dispensing agricultural product from each product tank in response to metering signals from the external guidance system and in response to metering signals from the operator control, and wherein metering signals from the operator control override metering signals from the external guidance system;
   a pneumatic distribution system connected to receive the agricultural products dispensed by the metering devices and convey the agricultural products to the furrow openers in response to distribution signals from the external guidance system and in response to distribution signals from the operator control, and wherein distribution signals from the operator control override distribution signals from the external guidance system;
   wherein the external guidance system sends location signals indicating a location of the implement frame to the operator control;
   wherein the operator control is portable and located remote from the tank propulsion vehicle.

2. The apparatus of claim 1 wherein the engine is connected to drive a generator; and comprising an electric motor connected to each vehicle wheel and each of the at least two implement wheels, and wherein the generator provides electric power to each electric motor.

3. The apparatus of claim 1 wherein the external guidance system receives location signals from at least one of a group of global positioning satellites, a group of signal towers, and a laser beam.

4. The apparatus of claim 1 further comprising at least one camera sending real time video of the implement frame to the operator control.

5. The apparatus of claim 1 comprising right and left location sensors located at corresponding right and left ends of the implement frame, the right and left location sensors sending location signals to the external guidance system and to the operator control.

6. The apparatus of claim 1 further comprising a system control operative to monitor functions of the tank propulsion vehicle and implement frame and display same on the operator control.

7. The apparatus of claim 6 wherein the system control compares the functions of the tank propulsion vehicle and implement frame to selected ranges for each monitored function, and wherein the system control is operative to shut down selected functions when deviations from the selected ranges are detected.

8. The apparatus of claim 6 wherein the system control monitors rotation of the vehicle wheels, flow of agricultural product from the metering devices, flow of agricultural product through the distribution system, and location of the implement frame.

9. The apparatus of claim 6 further comprising an encroachment sensor operative to detect an object in the path of the implement frame and send encroachment signals to the system control, and wherein the system control is operative to shut down rotation of the driven wheels when an object is detected in the path of the implement frame.

10. The apparatus of claim 1 wherein the engine is connected to rotate two implement wheels supporting a front center portion of the implement frame.

11. The apparatus of claim 1 wherein a weight of the tank propulsion vehicle decreases as agricultural products are dispensed from the product tanks from a full weight when the product tanks are substantially filled with agricultural products, to an empty weight when the product tanks are substantially empty, and wherein the empty weight provides sufficient ballast to the vehicle wheels and at least two implement wheels to maintain traction and move the apparatus along the ground.

* * * * *